United States Patent [19]

Hartmann

[11] 4,100,063

[45] Jul. 11, 1978

[54] METHOD AND APPARATUS FOR THE BIOLOGICAL CLEANSING OF WASTE WATER

[75] Inventor: Ludwig Hartmann, Karlsruhe, Fed. Rep. of Germany

[73] Assignee: Maschinenfabrik Hellmut Geiger, Karlsruhe-West, Fed. Rep. of Germany

[21] Appl. No.: 683,743

[22] Filed: May 6, 1976

Related U.S. Application Data

[63] Continuation of Ser. No. 543,423, Jan. 23, 1975, abandoned, which is a continuation of Ser. No. 380,545, Jul. 19, 1973, abandoned.

[30] Foreign Application Priority Data

Jul. 20, 1972 [DE] Fed. Rep. of Germany ....... 2235470

[51] Int. Cl.² .............................................. C02C 1/04
[52] U.S. Cl. ...................................... 210/17; 210/150
[58] Field of Search .......................... 210/17, 150, 151

[56] References Cited

U.S. PATENT DOCUMENTS

| 3,466,241 | 9/1969 | Simpson .................................. 210/17 |
| 3,468,795 | 9/1969 | Bye-Jorgensen et al. ............. 210/17 |
| 3,565,797 | 2/1971 | Gresham ............................. 210/151 |

*Primary Examiner*—Thomas G. Wyse
*Attorney, Agent, or Firm*—Ernest F. Marmorek

[57] ABSTRACT

A method and apparatus for cleaning waste water wherein waste water is charged into an apparatus having a plurality of plates adapted for growing a biological mass thereon, and wherein the biological mass is removed by mechanical means in a predetermined period of time independent from the charging of the waste water into the apparatus, and the cleaned waste water is continuously discharged from the apparatus.

7 Claims, 2 Drawing Figures

METHOD AND APPARATUS FOR THE BIOLOGICAL CLEANSING OF WASTE WATER

This is a continuation of application Ser. No. 543,423, filed Jan. 23, 1975, which was a continuation application of Ser. No. 380,545, filed July 19, 1973, both applications being abandoned.

FIELD OF INVENTION

The present invention generally relates to a method and apparatus for the biological cleansing of waste water, and more particularly it relates to a method for operating a percolating filter also known as a trickling filter, having flat elements for the growing of the biological mass and also it relates to an apparatus for practicing the method. The invention is an improvement on methods and apparatus for percolating-type filtering of waste water.

BACKGROUND OF THE INVENTION

Generally, it has been known that percolating-type filters, in a large number of cases, present a very good method for the biological cleansing of waste water. They combine a reliable and service-free operation with favorable operating conditions, such as, a short contact and hold-over time, which fact results a very economical cleansing operation.

The known percolating filter-type apparatus operating with chips, as the filling material possesses, however, a considerable disadvantage in that large areas of the percolating filter body become clogged and, thereby, the effective volume of it undergoes a great variation which is beyond control, although the cloggings usually free themselves automatically. Special measures have been proposed, such as the periodical charging of the filter with relatively large amounts of waste water which was believed to aid the removal of the clogged areas. Still, the method remained uncontrollable so that there was a need for percolating-type filters having flat surface elements for the growing of the biological mass. The flat elements were introduced in the form of plates, foils or pipes. Under certain conditions, by the above-type upper surface of the flat elements, one was able to obtain a larger effective upper surface per unit volume for a percolating-type filter. However, also in the case of the above-mentioned type of percolating filters having flat surface elements, the biological mass grows for a time period until it is released as a result of biological or physical conditions prevailing on the flat surface elements. Such releasing in the above-described percolating filter apparatus occurs in small surface areas and depends on local conditions. The released biological mass then wanders together with the waste water through the percolating-type filter and is present in the waste water when it is passed through the waste output conduit. Usually, then, the sludge becomes well separated by means of sedimentation from the waste water after it is passed through a special set of clearing basins.

It is considered a disadvantage in connection with the above-described known percolating-type filters, that the waste water quantity which is necessary for the rinsing, is larger than the average quantity charged over the entire upper surface of the filter. The periodic charging of the biological mass leads locally also to a non-uniform decomposition, although the optimum decomposition is understood to be represented by a uniform charging of waste water and air.

SUMMARY OF THE INVENTION

It is, therefore, an object of the present invention to provide an improved method and apparatus for a percolating-type waste water filter in which the operation of the filter can be controlled and in which, in a relatively small space, a large quantity of waste water can be processed.

The present invention also recognizes that the biological mass itself has an extremely favorable drying property and despite this in the known percolating-type filters it is lead away together with the waste water through a common output conduit, which fact results in an unnecessary suspension formation and in its thinning. One of the most complicated steps in the cleaning of waste waters resides in the removing of the water from the sludge. It is, therefore, extremely advantageous as the invention proposes, that the solid components of the biological mass which are obtained earlier, should not be reduced, but to the contrary, should be densified, thereby the conventional sedimentation step could be completely or at least partially spared.

To this effect, the invention proposes that the percolating-type filter is charged with waste water and air and the biological mass is mechanically removed from the growing surface before it could loosen itself biologically and/or physically.

BRIEF DESCRIPTION OF THE DRAWING

The invention will become more readily apparent from the following description of preferred methods and apparatus thereof for practicing the method, illustrated by way of example in the accompanying drawing, in which.

It has been found advantageous that during the removing process of the biological mass from the flat elements of the percolating filter, no waste water should be added in order to avoid that the waste water leaves together with the sludge.

DESCRIPTION OF THE PREFERRED EMBODIMENTS

Figure 1:
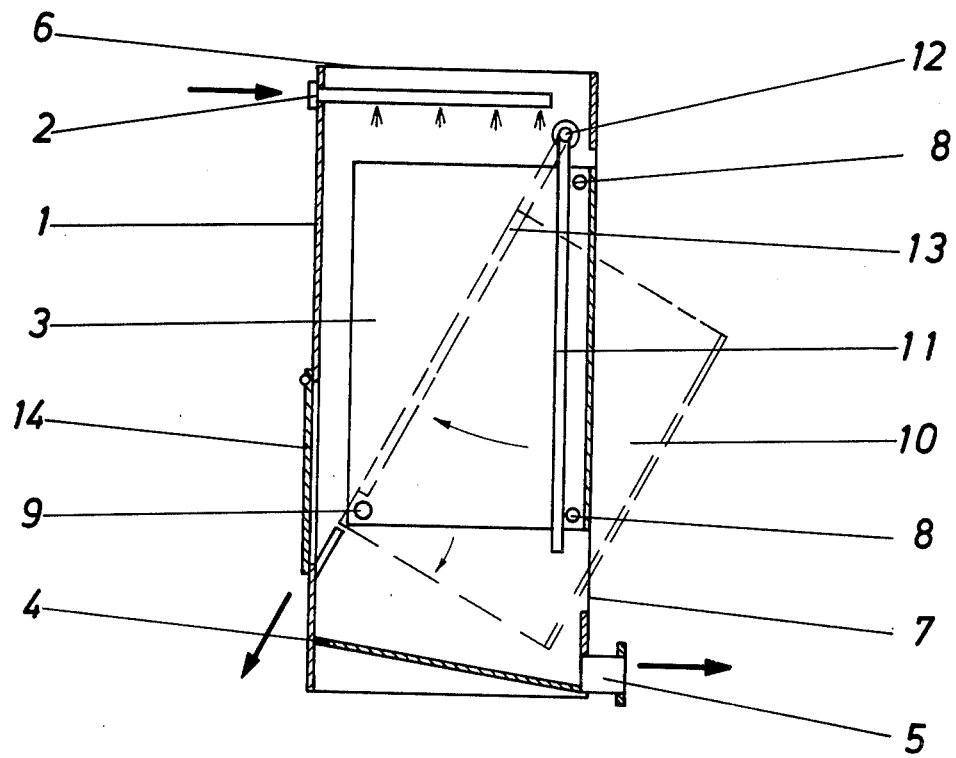
FIG. 1 is a schematic illustration, in a vertical section, of a percolating-type filter apparatus according to the present invention.
Figure 2:
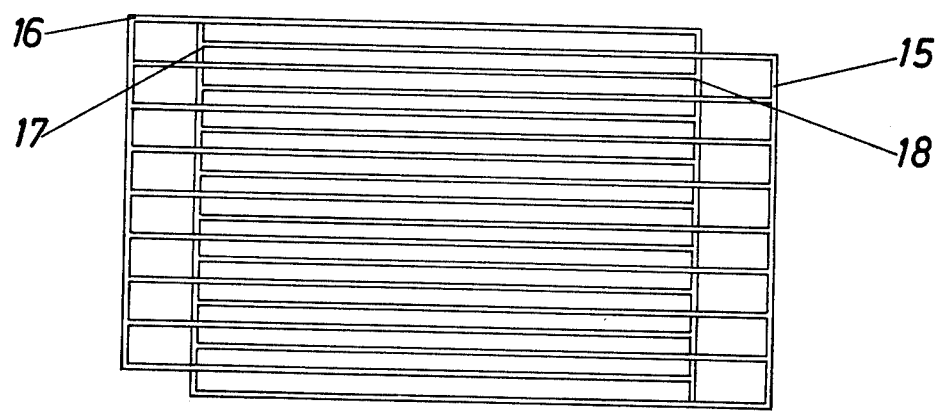
FIG. 2 is a horizontal sectional view through a percolating-type filter apparatus according to the present invention, in which the plates are inserted alternately from opposing sides.

With reference to FIGS. 1 and 2, it is seen that the percolating-type filter apparatus, according to the present invention, includes a housing 1 into which the waste water is fed through a charging arrangement 2, arranged above a plurality of spaced flat surface elements 3, which serve for the growing of the biological mass. The waste water is charged into the percolating filter apparatus through the charging device 2 above, preferably in an inclined spray, and leaves the apparatus through the slant floor 4, and enters an output pipe 5. The air, or similar medium which is necessary for the operation, can be fed through the upper open part 6 of the housing 1 and through the lower opening 7, also in the housing, and stream through the percolating filter. The flat elements 3 are held together into a single unit by means of a spacer support means 8 and are also supported in a journalled fashion in a lower spacer joint 9.

In the illustrated pivoted position, they are supported by a supporting means not illustrated in the drawing and as can be seen they can be pivoted into the position 10 indicated with the dashed lines. A plurality of comb-like removing means 11 is jointly journalled rotatably in an upper joint 12 and each element 11 is arranged between adjacent plates 3 to pivot into a position 13, indicated by the dashed line. In the illustrated arrangement, about half of the upper surface of the flat elements 3 become cleared from the growth of the biological mass by the pivoting of the removing device 11 into the position 13 against the direction of the pivoting movement of the flat elements 3 themselves, while the other half of the upper surface of the flat elements 3 becomes cleared from the biological mass growth by device 11 due to the fact that the elements 3 themselves can be jointly pivoted into the position 10. In the position 10 the elements 3 and in the position 13, the removing device 11 provide a slanted surface on which the sludge itself will roll downwardly and can leave the housing 1 through a chute 19 which is illustrated as being covered by a cover 14. The sludge which is removed through the chute 19 is substantially free from water and will not have to go through a sedimentation step again.

With reference to FIG. 2, illustrating another embodiment of the apparatus of the present invention, it is seen that the flat surface elements 3 are now arranged in two units 15 and 16 which are constructed to slide within each other in a comb-like fashion, that is, a plate 3 of unit 15 has two plates 3 of unit 16 lying adjacent thereto. The oppositely lying end portions 17 and 18 of units 15 and 16 are constructed as a scraping means so that when the unit 15 is moved to the right and unit 16 is moved to the left, the respective scraping means 17 and 18 remove the sludge from the entire surface of the adjacently lying plates 3 of the opposite unit. In other words, the end portion or scraping means 17 is arranged to move within adjacent plates of unit 16 and will scrape the adjacent plates of unit 16, while the scraping means 18 of unit 16 will scrape the adjacently lying plates 3 of unit 15. In the embodiment of FIG. 2, a separate scraping or removing device, like the device 11 of FIG. 1, is spared. The charging device for the embodiment of FIG. 2 can be similar to the one illustrated in connection with FIG. 1, while the scraping means 17 and 18 of the respective units 15 and 16 can be shaped, along with plates 3 of the units 15 and 16, so that the sludge which is removed by the scrapers 17 and 18 leaves through a chute similarly as in FIG. 1. Also the cleaned water can leave as in FIG. 1. It is also within the scope of the present invention that the units 15 and 16 may pivot with respect to each other about a pivot point for each unit and the scraping means 17 and 18 are then constructed to remove substantially all the sludge or biological growth from the adjacent plates 3 during such pivoting and guide it to a chute similarly as in FIG. 1.

In order to appreciate the great improvements achieved by the present invention with respect to known or conventional percolating-type filter units employed in cleaning waste water, the following data is presented. In percolating filter apparatus having a chip filling, the inner upper surface is about 100 $m^2/m^3$, while in conventional percolating filters having flat surface elements, the similar dimension is increased at 150–250 $m^2/m^3$. Using such a filler, the necessary spacing between adjacent flat elements was about 20mm as the minimum, since otherwise, even using a strong rinsing, cloggings could take place. On the other hand, according to the apparatus and method of the present invention, the spacing between the adjacent elements 3 can be reduced to a few millimeters whereupon the inner upper surface can be increased to 300 – 1,000 $m^2/m^3$ and, at the same time, retaining reliability of operation. The entire clearing capacity of the percolating-type filter apparatus greatly depends on the actively available biological mass, which in turn is proportional to the available inner upper surface of the percolating filter. As apparent from the above, the present invention offers an increase of the clearing capacity per volume of space.

Inasmuch as the apparatus, according to the present invention, requires a smaller space even at an increased capacity, the devices which have the function to remove the biological mass from the surface elements 3 can be also constructed lighter and simpler than in the hitherto known apparatus.

The fact that the apparatus, according to the present invention, does not require the rinsing step which is an essential step with the known percolating filter apparatus, is in itself an important progress within this art. A large number of rotational removing devices and measures for their operation have already been known and are simply disposed of by the present invention by the novel charging arrangement of the percolating filter apparatus and the novel exposure of the elements 3 to the biological mass and an optimum availability or exposure of the elements 3 to the waste water charged into the apparatus. For the present invention, the important factor becomes the efficiency of sludge removal and not the rinsing capacity which is the important factor with known apparatus.

As has been pointed out above, during the operation of the percolating-type filter apparatus, according to the present invention, the mechanical removal of the sludge is performed in various ways, reliably and in a progressive manner technically. It is also within the scope of the present invention to provide a measuring-switching arrangement for which a time period is selected which corresponds to the removal phase of the sludge. Such a time period, however, can be controlled by the growth of the biological mass itself on the plates 3 by an excessive amount of the sludge, such as the thickness of the sludge on the surface of the plates 3. Other parameters of the biological mass can be used to control the operation period of removal.

The method of operating the percolating-type filter apparatus, according to the present invention, is conditioned by the apparatus of the present invention used for commencing the removal process, which in turn can be initiated by a switching means or by a special shaping of the filter apparatus itself, or by additional control elements. As has been described, the percolating filter apparatus is preferred to be provided with flat elements 3, which are journalled as vertical plates with a straight upper surface. However, it is within the scope of the present invention to provide them with corrugated surfaces or other profiles. As has already been indicated above, between the plates 3 a mechanical removal arrangement 11 and 17, 18 is provided which extends longitudinally along one of the dimensions of the plates and is operable as discussed in connection with FIGS. 1 and 2. Inasmuch as the plates 3 in both embodiments are arranged very close to each other due to space considerations, it is intended that a removing device, such as a device 11 or 17, 18 be operable on adjacent plate surfaces 3 at the same time. As can be seen in FIGS. 1 and 2, the removal devices are arranged between the plates 3 in a comb teeth-like fashion and, by pivoting, as described in connection with FIG. 1, or by sliding, the comb teeth-like arrangement of the removal devices will force the sludge off from the adjacent plates. As indicated in connection with FIG. 1, the removal device 11 is pivotable up or down and the plates 3 are also pivotable, while in FIG. 2, although pivoting arrangements of the units 15 and 16 are also within the scope of the invention, it is preferred that the units move horizontally with respect to each other. It is also possible that the plates 3 themselves, act as a removal device by being appropriately shaped as is the case in connection with FIG. 2.

Inasmuch as the present invention does not rely on the rinsing effect by the waste water, a uniform charging and removal of the waste water is possible. It is preferred that the charging of the waste water occurs above the plates and that the spraying of the plates 3 is performed inclined with respect to a vertical line so that the waste water spray falls on the plates.

As has been pointed out, the method and apparatus according to the present invention provides an ideal and reliable operation of a waste water filter in every respect, such as charging, growth and the sludge removal. The excess sludge falls down containing a slight amount of water and removes itself very easily although, there is no sedimentation step present.

I wish it to be understood that I do not desire to be limited to the exact details of construction shown and described for obvious modifications will occur to a person skilled in the art.

Having thus described the invention, what I claim as new and desire to be secured by Letters Patent, is as follows:

1. A trickling filter apparatus for cleaning waste water, comprising, in combination:
   a housing;
   charging means near the upper part of said housing and operable for charging said waste water into said housing up to a predetermined level;
   a plurality of growth means uprightly suspended adjacently within said housing for growing a biological mass sprayable by the waste water, said biological mass being free from immersion in the waste water;
   removal means disposed between the adjacent growth means and operable for mechanically removing said biological mass from said growth means to form a sludge;
   first discharge means disposed in said housing below a substantial portion of said growth means and operable to cooperate with said removal means for discharging said sludge from said housing; and
   second discharge means disposed near the lowermost part of said housing and below said first discharge means and operable for continuously discharging the cleaned waste water, the predetermined level being between said first and said second discharge means.

2. The apparatus as claimed in claim 1, wherein said plurality of growth means comprises a plurality of flat elements.

3. The apparatus as claimed in claim 2, wherein said removal means is pivotably connected to said housing and operable for rotatably moving between the adjacent growth means for mechanically removing said biological mass.

4. The apparatus as claimed in claim 1, wherein said charging means is operable for discharging the waste water onto said growth means at an angle with respect to the vertical.

5. A method of cleaning waste water in a trickling filter comprising a housing, charging means near the upper part of said housing and operable for charging said waste water into said housing up to a predetermined level, a plurality of growth means uprightly suspended adjacently within said housing for growing a biological mass free from immersion in the waste water, removal means disposed between the adjacent growth means and operable for mechanically removing said biological mass from said growth means to form a sludge, first discharge means disposed in said housing below a substantial portion of said growth means, above said predetermined level, and operable to cooperate with said removal means for discharging said sludge from said housing, and second discharge means disposed near the lowermost part of said housing and below said first discharge means and operable for continuously discharging the cleaned waste water, comprising the steps of:
   charging the waste water into said apparatus, said predetermined level being between said first and said second discharge means; spraying the waste water onto said growth means; continuously discharging the cleaned waste water; and removing the biological mass.

6. The method as claimed in claim 5, wherein the biological mass is removed after a predetermined operational time.

7. The method as claimed in claim 5, wherein the removal of the biological mass is commenced after the biological mass has exceeded some predetermined thickness.

* * * * *